(12) United States Patent
Bae et al.

(10) Patent No.: US 7,324,484 B2
(45) Date of Patent: Jan. 29, 2008

(54) REVERSE LINK CONTROLLING METHOD IN A MOBILE COMMUNICATION SYSTEM

(75) Inventors: Beom-Sik Bae, Suwon-shi (KR); Dong-Seek Park, Suwon-shi (KR); Chang-Hoi Koo, Songnam-shi (KR); Dae-Gyun Kim, Taegu-Kwangyokshi (KR); Young-Wook Jung, Taejon-Kwangyokshi (KR); Dong-Ho Cho, Koje-shi (KR); Jung-Woo Cho, Koje-shi (KR)

(73) Assignee: Samsung Electronics Co., Ltd (KR)

( * ) Notice: Subject to any disclaimer, the term of this patent is extended or adjusted under 35 U.S.C. 154(b) by 1096 days.

(21) Appl. No.: 10/281,493

(22) Filed: Oct. 28, 2002

(65) Prior Publication Data
US 2003/0093364 A1 May 15, 2003

(30) Foreign Application Priority Data
Oct. 26, 2001 (KR) .................... 10-2001-0066478

(51) Int. Cl.
*H04B 7/216* (2006.01)

(52) U.S. Cl. ..................................... 370/335; 370/342

(58) Field of Classification Search ................ 370/335, 370/342
See application file for complete search history.

(56) References Cited

U.S. PATENT DOCUMENTS

| 6,628,955 B2 * | 9/2003 | Lee et al. ................... 455/466 |
| 6,741,862 B2 * | 5/2004 | Chung et al. ............. 455/452.1 |
| 7,046,966 B2 * | 5/2006 | Davis .......................... 455/69 |
| 7,146,174 B2 * | 12/2006 | Gardner et al. ............. 455/453 |

* cited by examiner

*Primary Examiner*—Brian Nguyen
(74) *Attorney, Agent, or Firm*—The Farrell Law Firm, PC (57) ABSTRACT

A reverse link controlling method in a mobile communication system. To increase or decrease a reverse data rate, an MS receives threshold power information indicating a power threshold for a pilot channel from the BS and measures the reception power of the pilot channel received from the BS. When the MS is supposed to increase or decrease the current data rate, it increases the current data rate by two levels or decreases the current data rate by one level if the pilot reception power is higher than the power threshold, and increases the current data rate by one level or decreases the current data rate by two levels if the pilot reception power is equal to lower than the power threshold.

12 Claims, 9 Drawing Sheets

(PRIOR ART)

REVERSE LINK CONTROLLING METHOD IN A MOBILE COMMUNICATION SYSTEM

PRIORITY

This application claims priority to an application entitled "Reverse Link Controlling Method in a Mobile Communication System" filed in the Korean Industrial Property Office on Oct. 26, 2001 and assigned Serial No. 2001-66478, the contents of which are hereby incorporated by reference.

BACKGROUND OF THE INVENTION

1. Field of the Invention

The present invention relates generally to a data rate controlling method in a mobile communication system, and in particular, to a reverse data rate controlling method.

2. Description of the Related Art

In general, IMT-2000 1xEV-DO (Evolution-Data Only) is a CDMA technique for providing high-speed data transmission only. Appropriate scheduling is required to efficiently transmit forward and reverse packet data in the 1xEV-DO system. Considering the air states and other environmental factors between a base station (BS) and mobile stations (MSs), the BS transmits data only to an MS at the best channel condition, to thereby maximize transmission throughput. For reverse packet data transmission, however, a plurality of MSs access the BS simultaneously. Therefore the BS must control overload within its capacity through appropriate control of reverse data flow and traffic congestion. 1xEV-DV (Evolution Data and Voice), a novel system under standardization, aiming at high-speed data transmission and voice service, must also control such overload.

In the 1xEV-DO system, an MS carries out reverse data transmission according to a RAB (Reverse Activity Bit) and a ReverseRateLimit (RRL) message received from a BS, and tells the BS its variable data rate via an RRI (Reverse Rate Indicator). The RRI indicates to the BS the data rate at which the reverse traffic data is being sent. The BS transmits time-division-multiplexed channels to the MS on an F-MAC (Forward Medium Access Control) channel: a pilot channel, an FAB (Forward Activity Bit) channel and a RAB channel. The RAB represents the congestion degree of the reverse link and a data rate available to the MS varies according to the RAB. The BS controls a data flow from the MS by commanding an increase/decrease in the reverse data rate using the RAB to thereby control the overload and capacity of the reverse link. The transmission time (or transmission period) of the RAB is determined by $$T \bmod RABlength \qquad (1)$$

where T is system time and RABlength is the length of the RAB expressed in the number of slots. Table 1 below lists binary values representing RAB lengths. The BS transmits one of the binary values to the MS in one slot and then the MS calculates a slot time when it receives the RAB on an F-MAC channel using the received RABlength information and the system time.

TABLE 1

| Binary | Length (slots) |
|---|---|
| 00 | 8 |
| 01 | 16 |
| 10 | 32 |
| 11 | 64 |

With the RAB received from the BS at the time calculated by Eq. (1), the MS determines a data rate available for the current reverse transmission. The MS receives PV (persistence vector) values in a message from the BS at or during a connection. The PV values are used in a PV test for increasing or decreasing a data rate when RAB=0 or RAB=1, respectively. When the PV test is passed, the MS doubles the current data rate or reduces it by half. When the PV test is failed, the MS maintains the current data rate. Specifically, when RAB=0 and the PV test is passed, the MS doubles the data rate. When RAB=1 and the PV test is passed, the MS reduces the data rate by half. The PV test is determined as passed if a random number satisfies a PV value.

From the system's perspective, this reverse data rate controlling method facilitates bandwidth and overload control. However, its uniform control for all MSs without considering their individual characteristics does not ensure efficient resources utilization.

Figure 1:
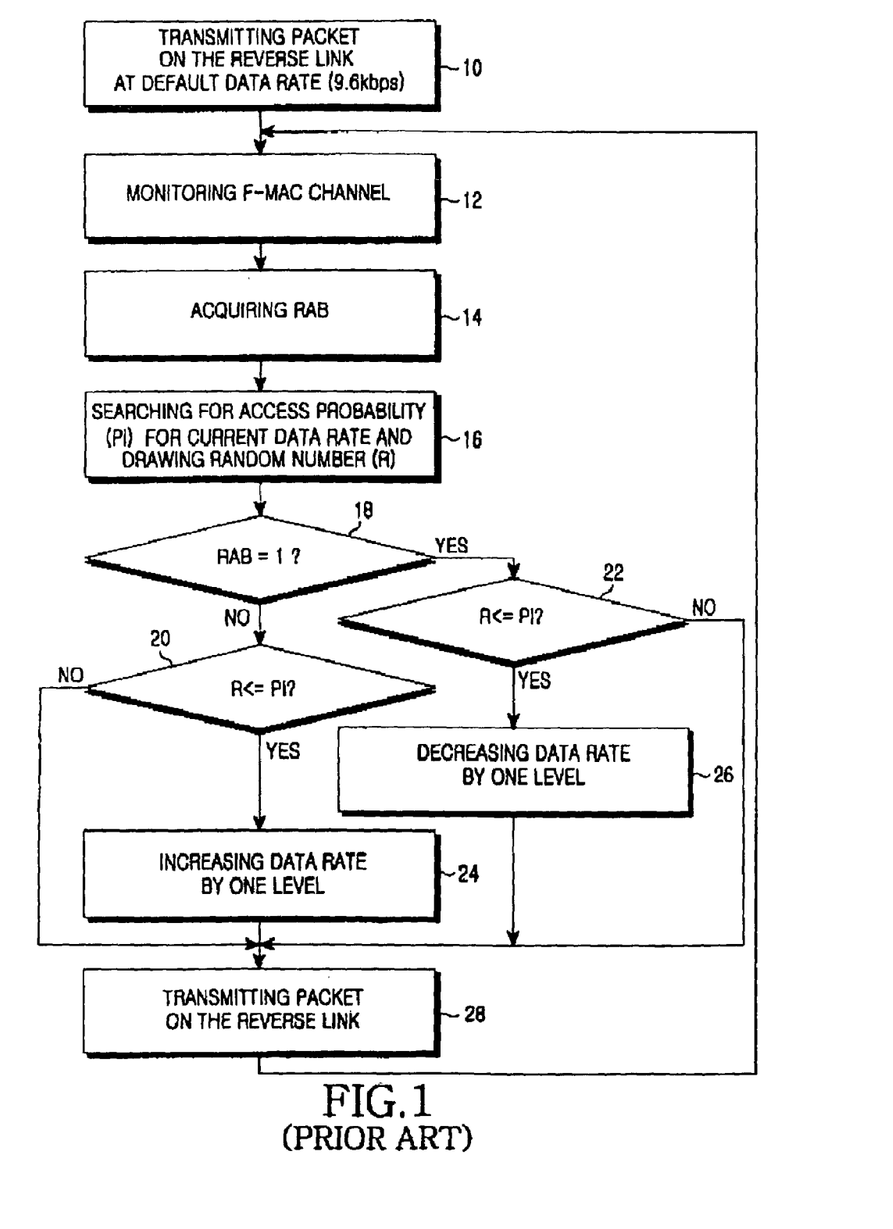
FIG. 1 is a flowchart illustrating a reverse data rate controlling method in an MS in a 1xEV-DO system.

The reverse data rate controlling method in the 1xEV-DO system will be described below. FIG. 1 is a flowchart illustrating the reverse data rate controlling method in an MS in the 1xEV-DO system.

The MS transmits initial data at a default data rate 9.6 kbps on the reverse link in step 10 and monitors an F-MAC channel in step 12. Upon receipt of a RAB on the F-MAC channel in step 14, the MS searches for an access probability Pi for the current data rate and generates a random number R in step 16. In step 18, the MS determines whether the RAB is 1. If the RAB is 1 and thus may result in a data rate decrease, the procedure goes to step 22, and if the RAB is 0 and thus may result in a data rate increase, it goes to step 20.

If the random number R is equal to or less than the access probability Pi, which implies that a PV test is passed, in step 20 or step 22, the MS increases or decrease its data rate by one level When step 20 goes to step 24, the MS increase data rate by one level, and when step 22 goes to step 26, the MS decrease the data rate by one level. Accordingly, a speed between levels has a double (or one-half) interval, which can be seen from Table. 2. In Table 2, it can be seen that the data rate is increased two times from 9.6 kbps through 153.6 kbps and is decreased by one-half from 153.6 kbps through 9.6 kbps. in step 24 or step 26. The MS transmits data at the changed data rate in step 28. If the changed data rate is lower than a data rate set in an RRL message, the MS transmits data on the set data rate 32 slots (53.33 ms) later. On the other hand, if the changed data rate is higher than the set data rate, the MS immediately changes its data rate to the set data rate.

After determining its data rate, the MS tells the BS the data rate in an RRI symbol as listed in Table 2 below. The data rate is one of 0, 9.6, 19.2, 38.4, 76.8 and 153.6 kbps.

TABLE 2

| Data rate (kbps) | RRI symbol |
|---|---|
| 0 | 000 |
| 9.6 | 001 |
| 19.2 | 010 |
| 38.4 | 011 |
| 76.8 | 100 |
| 153.6 | 101 |

To aid the MS in resetting its data rate, the BS transmits to the MS an RRL message having the structure shown in Table 3.

TABLE 3

| Field | Length (bits) |
| --- | --- |
| Message ID | 8 |
| 29 occurrences of the following two fields | |
| RateLimitIncluded | 1 |
| RateLimit | 0 or 4 |
| Reserved | Variable |

Upon receipt of the RRL message, the MS resets its data rate by comparing the current data rate with a data rate set in the RRL message. 29 records may be inserted in the above RRL message and each record indicates a data rate assigned to a corresponding one of MACindexes 3 to 31. In Table 3, Message ID indicates the ID of the RRL message. RateLimitIncluded is a field indicating whether RateLimit is included in the RRL message. If RateLimit is included, RateLimitIncluded is set to 1, and otherwise, it is set to 0. RateLimit indicates a data rate assigned to a corresponding MS. The BS assigns RateLimit data rates listed below to MSs using four bits.

| | |
| --- | --- |
| 0 × 0 | 0 kbps |
| 0 × 1 | 9.6 kbps |
| 0 × 2 | 19.2 kbps |
| 0 × 3 | 38.4 kbps |
| 0 × 4 | 76.8 kbps |
| 0 × 0 | 153.6 kbps |

All other values are invalid

During reverse data transmission, the MS monitors the F-MAC channel from the BS, especially the RAB on the F-MAC channel and resets its current data rate by performing a PV test.

Figure 2:
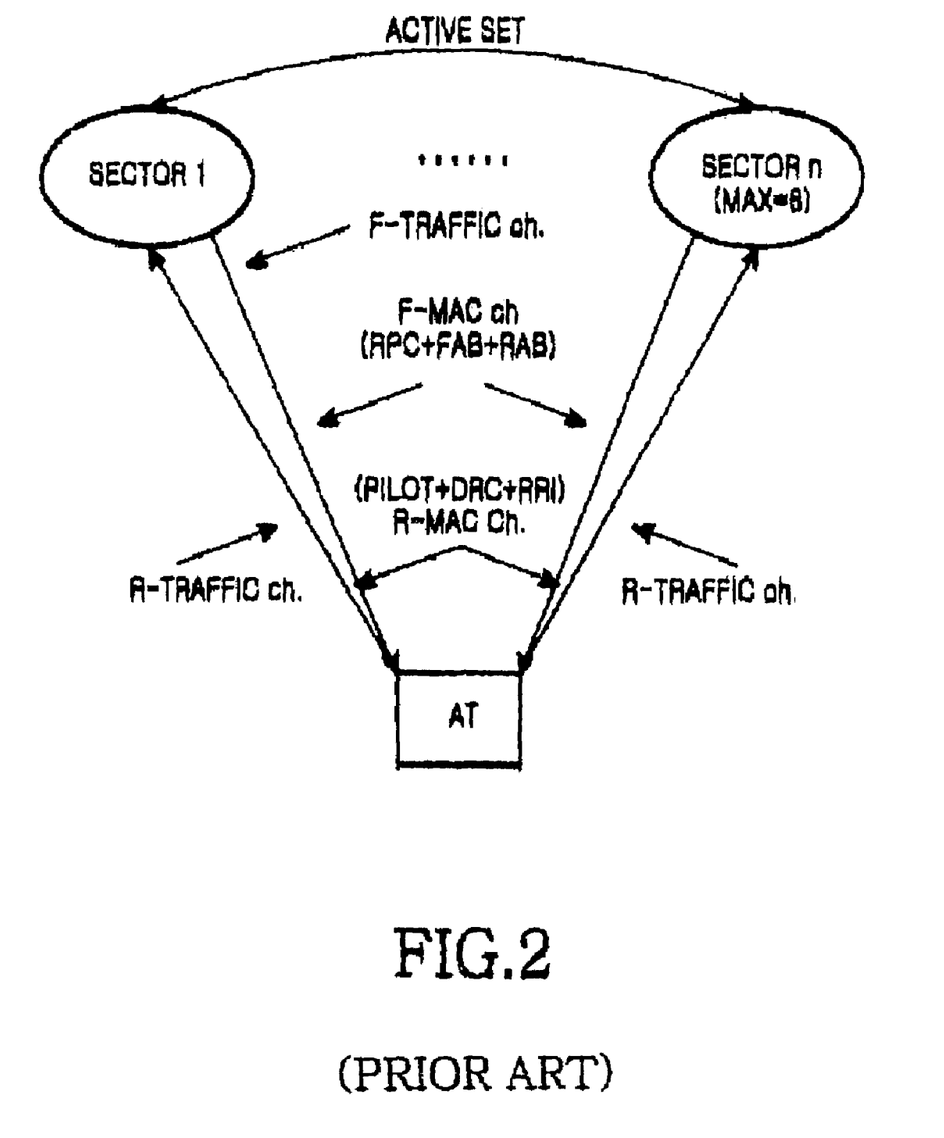
FIG. 2 is a diagram illustrating operations between an MS and 1xEV-DO sectors in its active set.

FIG. 2 is a diagram illustrating data transmission/reception between an MS and 1xEV-DO sectors in its active set in the case of a sectored BS. In FIG. 2 "AT" refers to "Access Terminal" as used in the EV-DO standard, and corresponds to the BS. Referring to FIG. 2, F- and R-traffic channels and F- and R-MAC channels have been established between the MS and sector 1 with a connection opened between them. No F-traffic channels are assigned to the MS from sector 2 (up to six sectors 2 to 6) with no connection opened between them. In the 1xEV-DO system, the MS can maintain up to six BS sectors in its active set. Therefore, the MS monitors F-MAC channels from the active set sectors, especially RABs to determine its data rate.

Upon receipt of at least one RAB set to 1, the MS performs a PV test to determine whether to decrease its data rate. In the PV test, the MS generates a random number and compares it with a PV value for decreasing a data rate as defined by the BS at or during a connection. If the random number satisfies the PV value, the MS reduces its data rate by half, considering that the PV test is passed. On the contrary, if the PV test is failed, the MS maintains its data rate. If the data rate is lower than the default data rate, the MS sets its data rate to the default data rate. Meanwhile, if all the RABs are 0 and a PV test is passed, the data rate is doubled. If the PV test is failed, the MS maintains its data rate. If the increased data rate is higher than the highest available data rate, the MS sets its data rate to the highest data rate. In the case where the MS is limited in transmission power, it maintains its data rate. The RAB that leads to a one-half data rate increase or a half-data rate decrease on the reverse link is broadcast to MSs in time-division-multiplexing with an FAB on a forward common channel, the F-MAC channel. The MSs perform PV tests for increasing or decreasing their data rates uniformly according to the RAB.

In this reverse data rate controlling method for the 1xEV-DO system, reverse data rate is controlled based on probability since a PV test is performed according to a RAB. As a result, the full utilization of the reverse link is delayed. The uniform control without considering the individual statuses of MSs brings about resources inefficiency. The individual data rate control drastically increases overhead, degrading the system performance.

SUMMARY OF THE INVENTION

It is, therefore, an object of the present invention to provide a method of efficiently controlling reverse data rate in a mobile communication system.

It is another object of the present invention to provide a method for shortening time required to reach the full utilization of a reverse link in a mobile communication system supporting data transmission.

It is a further object of the present invention to provide a method of individually controlling the reverse data rates of MSs in a mobile communication system supporting data transmission.

It is still another object of the present invention to provide a method of efficiently controlling the overload of a BS by allowing an MS to flexibly increment or decrement a reverse data rate.

To achieve the above and other objects, to increase or decrease a reverse data rate, an MS receives threshold power information indicating a power threshold for a pilot channel from the BS and measures the reception power of the pilot channel received from the BS. When the MS is supposed to increase or decrease the current data rate, it increases the current data rate by two levels or decreases the current data rate by one level if the pilot reception power is higher than the power threshold, and increases the current data rate by one level or decreases the current data rate by two levels if the pilot reception power is equal to or less than the power threshold.

In a reverse data rate controlling method, a BS receives RRIs from MSs during reverse data transmission, sets a RAB based on the load of a reverse link and remaining reverse link capacity, and transmits the RAB to the MSs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Terms "forward" and "reverse" used herein indicate a direction from a BS to an MS and a direction from an MS to a BS, respectively. While the following description is made in the context of a 1xEV-DO system, it is to be appreciated that the present invention is also applicable to 1xEV-DV in the same manner.

The present invention provides, among other things, an MS operation algorithm, a BS operation algorithm, and message structures and transmission information for supporting them to perform an efficient reverse data rate control.

According to the present invention, a RAB is broadcast to all MSs on an F-MAC channel as in the conventional 1xEV-DO reverse data rate control method. The MSs are classified into specific groups according to their pilot reception power and power thresholds set by the BS. Within a range allowed for each group, the reverse data rates are individually controlled.

More specifically, the BS transmits threshold power information for defining groups to the MSs by a signaling message or in symbols of a physical layer when MS groups are initially defined or the grouping condition is changed. The threshold power information can be formed to indicate actual values. Alternatively, a predetermined number of power levels are pre-stored in the MSs and the BS transmits a threshold power indicator indicating one of the power levels to the MSs. The volume of the threshold power information increases or decreases depending on the number of MS groups. According to the present invention, the threshold power information is transmitted to the MSs by a message formed as illustrated in Table 4.

TABLE 4

| Field | Length (bits) |
|---|---|
| Message ID<br>X occurrences of the following fields | 8 |
| Number of Threshold Power Levels<br>One or more occurrences of the following field | 3 |
| Power Level<br>Power level + 1 occurrences of the following field | 3 |
| Rate_UP_DOWN | 3 |

The message contains threshold power information and data rate increment/decrement information. In 1xEV-DO, the message is delivered on the F-MAC channel and includes as many records as the number of MSs within a cell or a maximum number of available MSs along with as many MACindexes for identifying the MSs. In other systems, the message is delivered on a dedicated channel or a common channel. In the former case, the message is transmitted to a particular MS and in the latter case, it is broadcast to all MSs.

In the case of an individual reverse data rate control, a set of Number of Threshold Power Levels, Power Level, and Rate_UP_DOWN occur as many times (X) as the number of MSs within a cell or the maximum number of available MSs. On the other hand, if each of the fields provides one value commonly to the MSs, the fields occur once. In this case, X in "X occurrences of the following fields" is 1.

Number of Threshold Power Levels determines the number of MS groups, that is, it is used to group the reverse data rates according to pilot reception power. For example, if Number of Threshold Power Levels is 2, an MS belongs to one of three MS groups.

Power Level indicates a power level that defines groups. The BS transmits a real power value to an MS, or it transmits an indicator indicating a specific power level to the MS.

Rate_UP_DOWN indicates a rate increment/decrement for a corresponding MS group. This field occurs one more time than Power Level. For example, if three Power Level fields exist, four Rate_UP_DOWN fields are provided.

Figure 4:
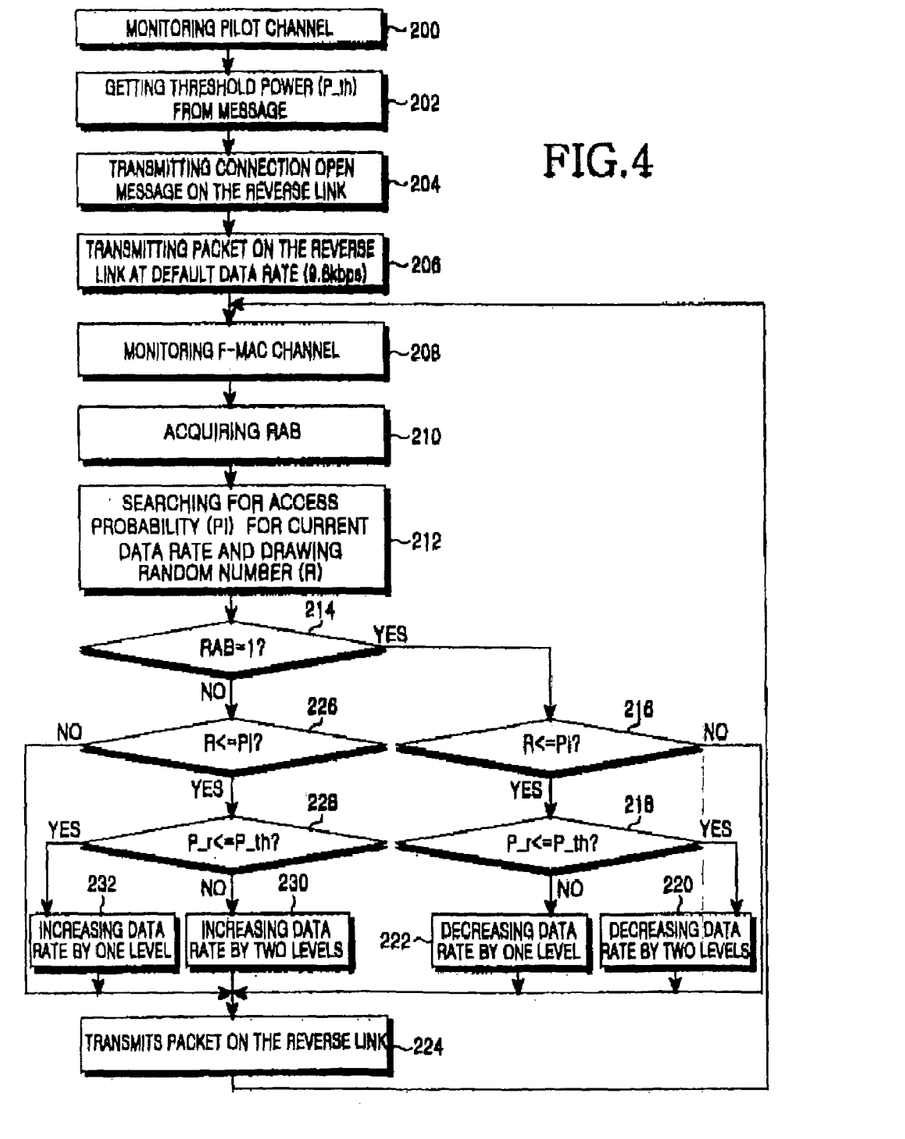
FIG. 4 is a flowchart illustrating an embodiment of a reverse data rate controlling method in an MS in the mobile communication system according to the present invention.

Table 5 illustrates an example of the message illustrated in FIG. 4 when two MSs are individually controlled.

TABLE 5

| Field | Length (bits) |
|---|---|
| Message ID<br>X(2) occurrences of the following fields | 8 |
| Number of Threshold Power Levels | 3 (001) |
| Power Level | 3 (000) |
| Power Level | 3 (001) |
| Rate_UP_DOWN | 3 (000) |
| Rate_UP_DOWN | 3 (001) |
| Rate_UP_DOWN | 3 (010) |

In Table 5, "X(2) occurrences of the following fields" indicates an individual control of two MSs. Number of Threshold Power Levels indicates the presence of two power levels. The first Rate_UP_DOWN indicates a rate increment/decrement, for example, a one-time rate increase/decrease when the reception power of an MS is equal to or lower than the first power level. The second Rate_UP_DOWN indicates a rate increment/decrement, for example, a twofold rate increase/decrease when the reception power of the MS is between the first and second power levels. The third Rate_UP_DOWN indicates a rate increment/decrement, for example, a threefold increase/decrease when the reception power of an MS is equal to or higher than the second power level.

Mapping of the field values depends on cell status, the characteristics of MSs within the cell, and service characteristics. Therefore, specific numerical values are not provided here.

The message illustrated in FIG. 4 is received at an MS from a BS at a call setup or during a call. The transmission of the message is performed in well-known manners and thus is not described here. Instead, pilot reception power measuring and other related operations after receiving the message will mainly be described.

TABLE 6

| Field | Length (bits) |
|---|---|
| Message ID<br>X occurrences of the following fields | 8 |
| Number of Threshold Power Levels | 3 |

TABLE 6-continued

| Field | Length (bits) |
|---|---|
| One or more occurrences of the following field | |
| Power Level | 3 |
| Power level + 1 occurrences of the following field | |
| Transition009k6_019k2 | 8 |
| Transition019k2_038k4 | 8 |
| Transition038k4_076k8 | 8 |
| Transition076k8_153k6 | 8 |
| Transition019k2_009k6 | 8 |
| Transition038k4_019k2 | 8 |
| Transition076k8_038k4 | 8 |
| Transition153k6_076k8 | 8 |

This message contains threshold power information and PV values with which a PV test for increasing or decreasing a data rate is performed. That is, the embodiment of the present invention discloses a method for dynamically assigning PV values to a mobile station at the base station. The message is delivered on a dedicated channel or a common channel. In the former case, the message is transmitted to a particular MS and in the latter case, it is broadcast to all MSs.

In the case of an individual reverse data rate control, a set of Number of Threshold Power Levels, Power Level, and the PV values occur as many times (X) as the number of MSs within a cell or the maximum number of available MSs. On the other hand, if each of the fields provides one value commonly to the MSs, the fields occur once.

Number of Threshold Power Levels determines the number of MS groups, that is, it is used to group the reverse data rates according to pilot reception power. If Number of Threshold Power Levels is 2, an MS belongs to one of three MS groups.

Power Level indicates a power level that defines groups. The BS transmits an actual power value to an MS, or it transmits an indicator indicating a specific power level to the MS. According to the number of power levels, the number of the PV value fields is determined. For example, if three power levels are set, four PV values for each data rate are provided.

Figure 3:
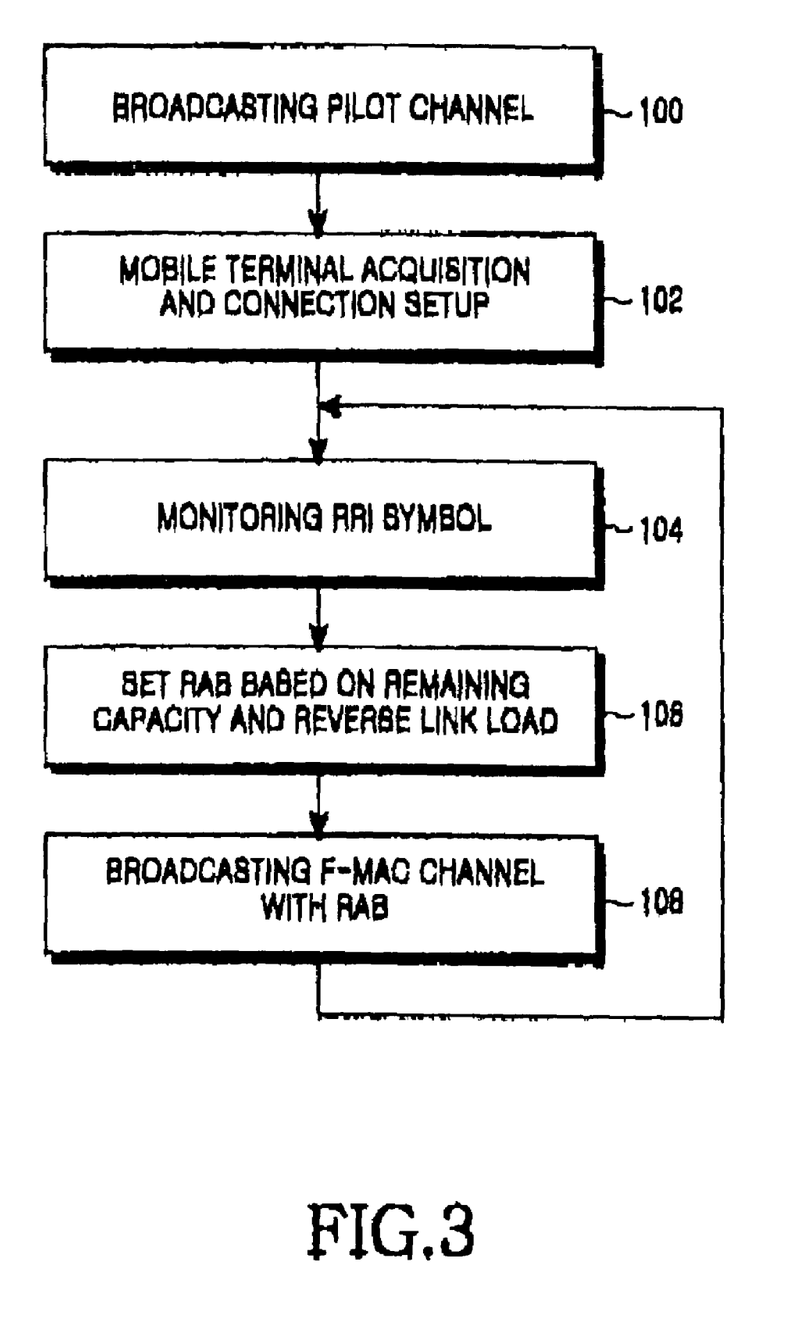
FIG. 3 is a flowchart illustrating an embodiment of a reverse data rate controlling method in a BS in a mobile communication system according to the present invention.

FIG. 3 is a flowchart illustrating an embodiment of a reverse data rate controlling method in a BS in a mobile communication system according to the present invention. It is assumed that all MSs within the service area of the BS are classified into two groups, that is, a group near to the BS, thus in an optimum pilot reception condition, group 1, and a group remote from the BS, thus in a non-optimum pilot reception condition, group 2 according to their positions.

Referring to FIG. 3, the BS broadcasts a pilot channel in its cell, thus defining its cell area in step 100. Upon receipt of connection open request messages from MSs, the BS acquires the MSs and establishes connections with them in step 102. Thus the MSs are able to exchange packet data with the BS.

The MSs then tell the BSs their data rates by RRI symbols. In 1xEV-DV, the reverse data rates can be reported to the BS on a channel or in a symbol when necessary, or all the time. The reverse data rate controlling method illustrated in FIG. 3 is described herein in the context of 1xEV-DV.

In step 104, the BS monitors the RRI symbols and checks its current system capacity and the load of the reverse link. The BS sets an RAB considering the system capacity and reverse link load in step 106 and broadcasts the RAB on an F-MAC channel in the cell in step 108. A predetermined time later, the BS monitors RRI symbols from the MSs in step 104. By repeating this procedure, the BS controls the reverse data rates of the MSs.

FIG. 4 is a flowchart illustrating an embodiment of a reverse data rate controlling method in an MS in the mobile communication system according to the present invention.

Referring to FIG. 4, the MS monitors a pilot channel from a BS in step 200. In particular, the MS determines its group by continuously comparing its pilot reception power with a power threshold received from the BS at a call setup or during a call. Then the MS stores a data rate increment/decrement also received from the BS available to its group in step 202 and transmits a connection open request message to the BS on the reverse link in step 204. When the BS establishes a connection with the MS, the MS attempts an initial reverse link access at a default data rate, 9.6 kbps in step 206. While the default data rate is 9.6 kbps in the existing 1xEV-DO systems, it is system-dependent.

In step 208, the MS monitors F-MAC channels from active set sectors of one or more BSs ("BS sectors"), especially RABs during the reverse data transmission. The MS can receive as many pilot channels as active set BS sectors. If a connection is opened between the MS and a sector, the sector assigns F- and R-traffic channels and F- and R-MAC channels to the MS. Meanwhile, no F-traffic channels are established between a sector and the MS where no connection is opened between them. The MS monitors only a control channel from such a sector.

The MS stores the RABs and the highest of F-MAC channel reception powers $P\_r$ in step 210 and generates a random number R to be compared with access probabilities Pi received from the BS in step 212. That is, the MS decides whether to increase or decrease its data rate by performing a PV test by comparing the random number R and a PV value for the current data rate, Pi.

If at least one of the RABs is 1 in step 214, the MS performs a PV test by comparing an access probability Pi with the random number R in step 216. When the MS receives data indicating that RAB are increased (RAB=0) from BSs and/or sectors included in an active set, it is determined as a command to increase the data rate, whereas when the MS receives data that at least one RAB is decreased (RAB=1) from BSs and/or sectors included in an active set, it is determined as a command to decrease data rate. If the random number R is greater than the access probability Pi in step 216, the MS maintains its current data rate. Then the MS transmits a reverse packet to the BS at the current data rate in step 224 and returns to step 208.

On the other hand, if the random number R is equal to or less than the access probability Pi in step 216, the MS compares the pilot channel reception power $P\_r$ stored in step 210 with the power threshold $P\_th$ in step 202. If the reception power $P\_r$ is higher than the power threshold $P\_th$, which implies that the MS belongs to group 1, the MS decreases the current data rate by one level in step 222. In step 224, the MS transmits data to the BS at the decreased data rate. If the current data rate is lowest, the MS maintains it.

On the other hand, if the reception power $P\_r$ is less than or equal to the threshold power $P\_th$, which implies that the MS belongs to group 2, the MS decreases the current data rate by two levels in step 220 and transmits data to the BS at the decreased data rate in step 224. It is also to be noted that if the current data rate is lowest, the MS maintains it and, if only one-level decrease is available, the MS decreases the current data rate by one level. The data rate increments/decrements available to the MS vary according to values set in the message fields illustrated in Table 4.

If all the RABs are 0 in step 214, the MS goes to step 226. In the conventional 1xEV-DO system, when all RABs are 0, the current reverse data rate is increased by only one level taking into account the transmission power and the highest available data rate of the MS, whereas according to the present invention, one or more level data rate increase is available depending on MS groups. In step 226, the MS performs a PV test. If the random number R is greater than an access probability Pi, the MS maintains the current data rate and transmits data to the BS at the current data rate in step 224 and returns to step 208.

If the random number R is equal to or less than the access probability Pi, the MS compares the reception power $P\_r$ with the power threshold $P\_th$ in step 228. If the reception power $P\_r$ is greater than the power threshold $P\_th$, which implies that the MS belongs to group 1, the MS increases the current data rate by two levels in step 230. In step 224, the MS transmits data to the BS at the increased data rate. If the current data rate is already at its highest, the MS maintains it. If only one-level data rate increase is available, the MS increases the current data rate by one level.

On the other hand, if the power threshold $P\_r$ is less than or equal to the reception power $P\_th$, which implies that the MS belongs to group 2, the MS increases the current data rate by one level in step 232 and transmits data to the BS at the increased data rate in step 224. It is also to be noted that if the current data rate is highest, the MS maintains it.

As described above, the above data rate increments and decrements available to the MS are merely exemplary and thus can be set differently. The BS may also set different PV values for each MS group and the PV values can be transmitted to the MS by the same message as delivers PV values to each MS. The PV values can be received from the BS at a call set-up or during a call and commonly or individually.

In the above-described manner, reverse data rates can be selectively controlled according to the locations of MSs, thereby leading to efficient utilization of resources.

Figure 5A:
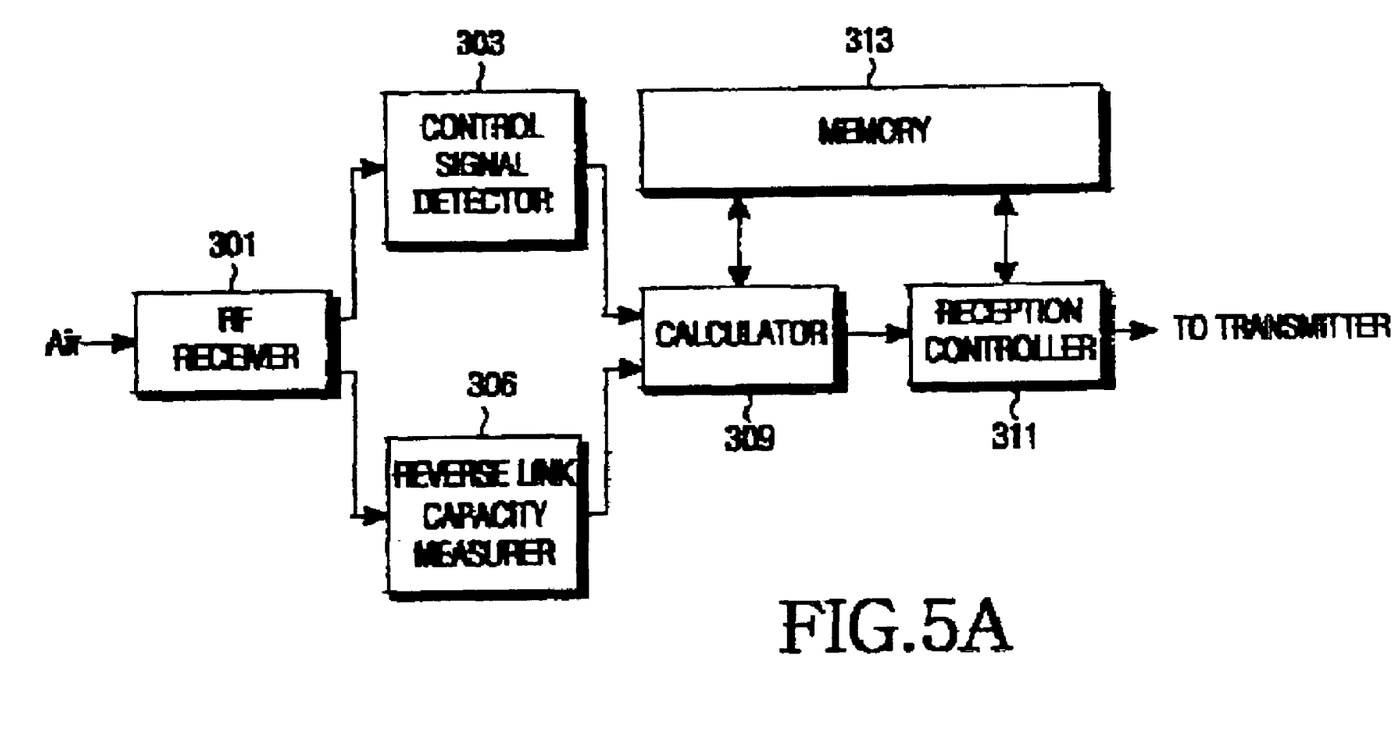
FIGS. 5A and 5B are block diagrams of the BS to which the present invention is applied.

FIG. 5A is a block diagram of a receiver in a BS to which the present invention is applied. Referring to FIG. 5A, an RF (Radio Frequency) receiver 301 converts signals including RRIs received in the air to baseband signals. A control signal detector 303 detects control signals including the RRIs from the baseband signals. A reverse link capacity measurer 306 determines the capacity of the reverse link from the baseband signals by measuring Rise-Over-Thermal of the reverse link, thereby determining a system load state.

A calculator 309 receives the control signals and information about the reverse link capacity and calculates the system load state numerically. A reception controller 311 determines the value of a control signal, that is, a RAB based on the system load state. Specifically, the RAB is determined according to threshold power information and changes in data rate increments/decrements. A memory 313 stores BS information, information about forward and reverse data rates set for MSs, and previously transmitted control information.

Figure 5B:
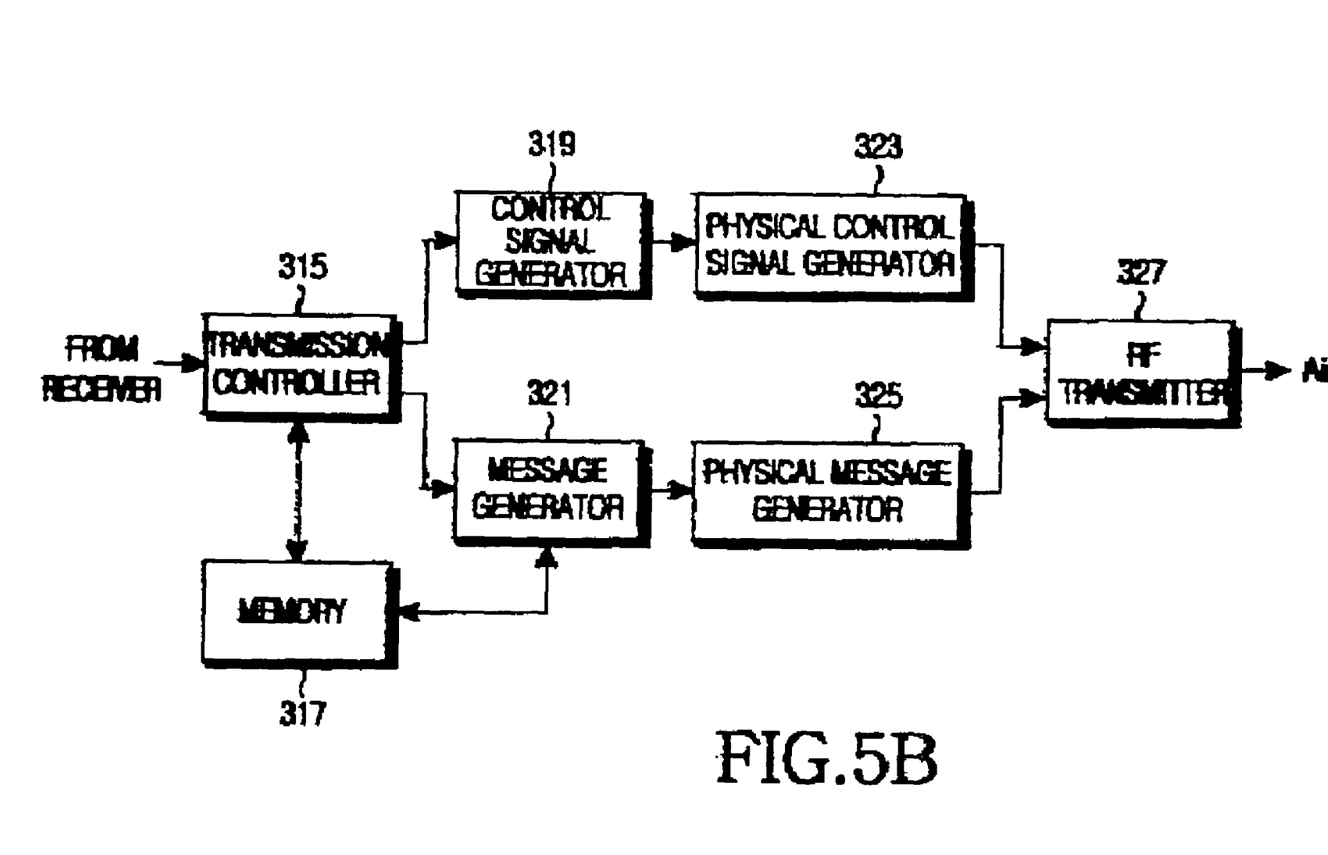

FIG. 5B is a block diagram of a transmitter in the BS. Referring to FIG. 5B, a transmission controller 315 transmits the RAB to a control signal generator 319, and also transmits to a message generator 321 information about whether messages are to be transmitted to users and transmission data for users. The control signal generator 319 generates a control signal based on the RAB. A physical control signal generator 323 converts the control signal to a physical signal. An RF transmitter 327 converts the physical control signal to a signal in a transmission frequency band and transmits it to an MS on a particular channel.

Upon receipt of the information about whether messages are to be transmitted to users, the message generator 321 correspondingly generates messages according to users. Then the physical message generator 325 converts the messages to physical messages and the RF transmitter 327 converts the physical messages to a signal in the transmission frequency band. A memory 317 stores control messages for the transmission controller 315 and temporarily stores transmission messages and control messages of message generator 321.

The transmission controller 315 and the reception controller 311 can be realized in a single microprocessor, while they are illustrated separately for convenience' sake. Similarly, the memories 313 and 317 can be integrated into one memory.

Figure 6A:
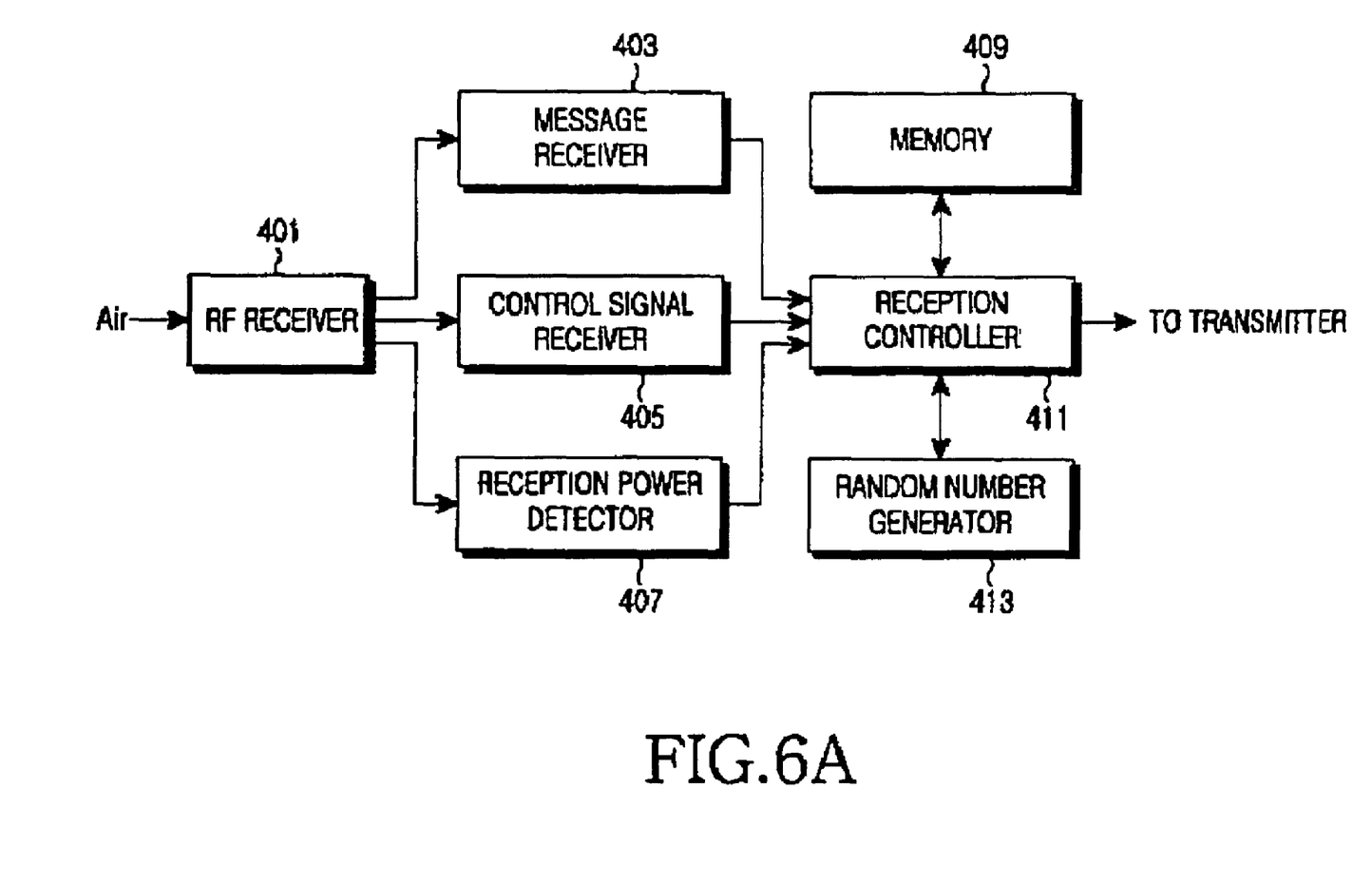
FIGS. 6A and 6B are block diagrams of the MS to which the present invention is applied.

FIG. 6A is a block diagram of a receiver in an MS to which the present invention is applied. Referring to FIG. 6A, an RF receiver 401 downconverts a message and a control signal including an RAB to baseband signals. A message receiver 403 decodes the downconverted message. A control signal receiver 405 extracts the control signal from the downconverted signals. The outputs of the message receiver 403 and the control signal receiver 405 are used to control a reverse data rate. A reception power detector 407 measures the reception power of the input signal, that is, the strength of a received pilot signal.

A reception controller 411 updates its control information table stored in a memory 409 according to a message received from the BS. The reception controller 411 also determines its MS group according to the plot reception power referring to the control information table, compares an access probability for the current reverse data rate with a random number generated in a random number generator 413, and determines whether to increase/decrease the data rate and its increment/decrement. The memory 409 stores the control information table and information about the current reverse data rate.

Figure 6B:
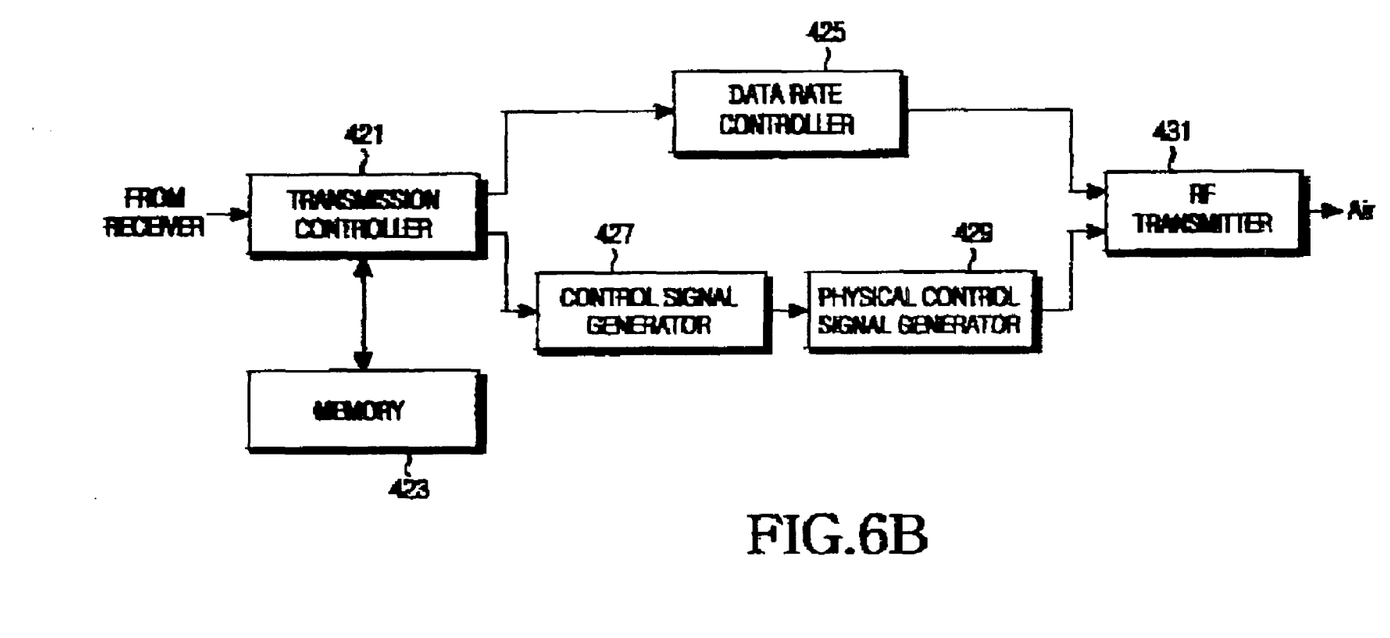

FIG. 6B is a block diagram of a transmitter in the MS. Referring to FIG. 6B, a transmission controller 421 receives the reverse data rate change-related information from the reception controller 411, controls a data rate controller 425 and a control signal generator 427 to change or maintain the data rate according to the reverse data rate change-related information, and controls generation of a control signal to be transmitted to the BS correspondingly. The data rate controller 425 controls the reverse data rate and the control signal generator 427 generates a control signal including an RRI. Then a physical control signal generator 429 converts the control signal to a physical signal and an RF transmitter 431 transmits the physical control signal to the BS.

The reception controller 411 and the transmission controller 421 can be integrated in a single microprocessor, as well as the memories 409 and 423.

Figure 7:
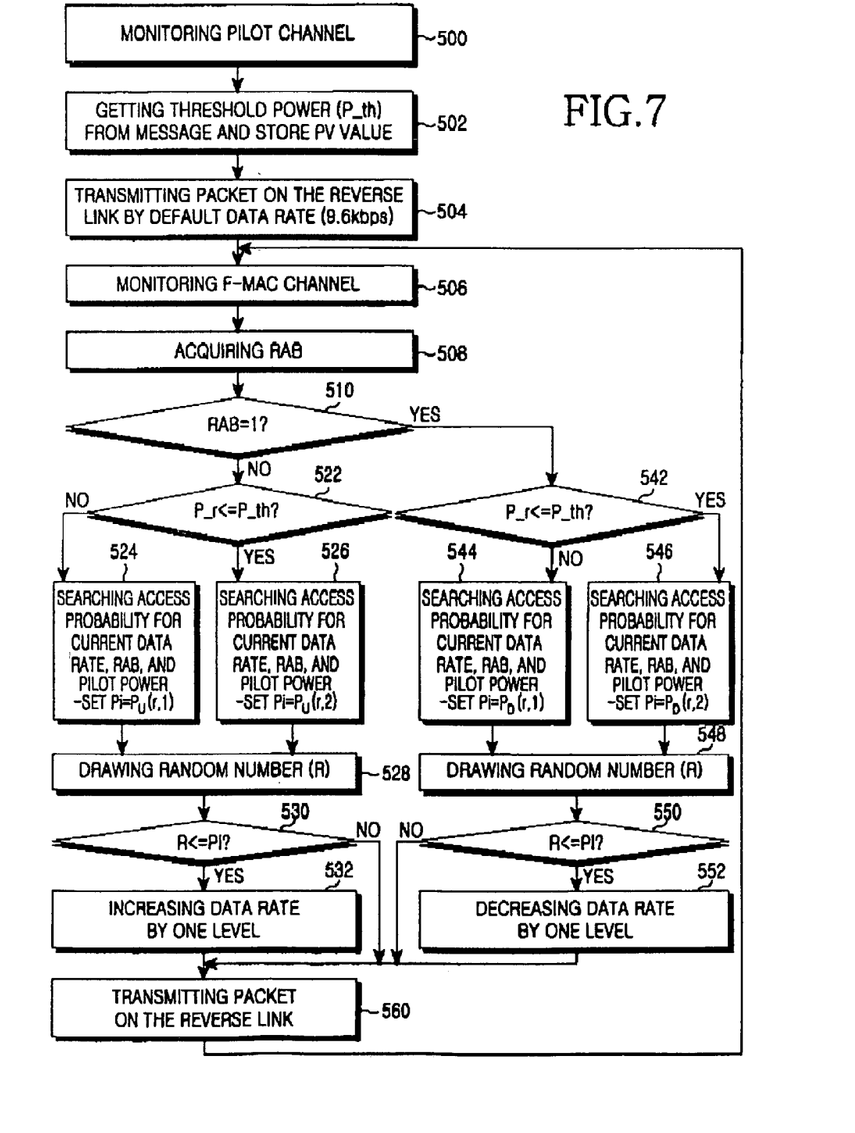
FIG. 7 is a flowchart illustrating another embodiment of the reverse data rate controlling method in the MS in the mobile communication system according to the present invention.

FIG. 7 is a flowchart illustrating another embodiment of the reverse data rate controlling method in the MS in the mobile communication system according to the present invention. In the second embodiment, a mobile station is divided into a specific group according to an intensity of the pilot, and PV values are dynamically assigned according to the characteristics of the specific group, to thereby determine efficient data rate.

In this embodiment, one threshold power level $P\_th$ is set and two PV values for each data rate are set with respect to the threshold power level $P\_th$. Referring to FIG. 7, the MS monitors a pilot channel from a BS in step 500. In particular, the MS determines its group by continuously comparing its pilot reception power with a power threshold P_th received from the BS at a call set-up or during a call. Then the MS stores PV values for data rates available to its group received from BS in step 502 and transmits a connection open request message to the BS on the reverse link. When the BS establishes a connection with the MS, the MS attempts an initial reverse link access at a default data rate, 9.6 kbps in step 504. While the default data rate is 9.6 kbps in the existing 1xEV-DO systems, it is system-dependent.

In step 506, the MS monitors an F-MAC channel, especially a RAB during the reverse data transmission. The MS can receive as many RABs as the number of active set BSs/sectors. If a connection is opened between the MS and a sector/BS, the sector/BS assigns F- and R-traffic channels and F- and R-MAC channels to the MS. Meanwhile, no F-traffic channels are established between a BS/sector and the MS if no connection is opened between them. The MS monitors only a control channel from such a sector/BS.

Upon receiving the RABs in step 508, the MS determines whether at least one RAB is 1 in step 510. When the MS receives data indicating that RAB are increased (RAB=0) from BSs and/or sectors included in an active set, it is determined as a command to increase the data rate, whereas when the MS receives data indicating that at least one RAB is decreased (RAB=1) from BSs and/or sectors included in an active set, it is determined as a command to decrease the data rate. If at least one RAB is 1, the MS goes to step 542 and otherwise, it goes to step 522. In step 522 and 542, the MS stores the highest P_r of F-MAC channel reception powers. If the reception power P_r is greater than the power threshold P_th in step 522, which implies that the MS belongs to group 1, the MS selects in step 524 a PV value Pi for the current data rate, PU(r, 1) which denotes a PV value for increasing a data rate when the data rate of an MS in group 1 is r. The power threshold P_th is the value included in the message received from step 502 or may be a predetermined value in a memory of the mobile station.

On the other hand, if the power threshold P_r is less than or equal to the reception power P_th, which implies that the MS belongs to group 2, the MS selects a PV value Pi for the current data rate, PU(r, 2) which denotes a PV value for increasing a data rate when the data rate of an MS in group 2 is r in step 526.

Then the MS generates a random number R for a PV test in step 528 and performs the PV test in step 530. If the PV test is passed, i.e., R is less than or equal to Pi, the MS increases the data rate by one level in step 532. If the test fails in step 530, the MS maintains the data rate. In step 560, the MS transmits reverse traffic data at the changed or current data rate.

If at least one RAB is 1, the MS compares the reception power P_r with the power threshold P_th in step 542. If the reception power P_r is greater than the power threshold P_th in step 542, which implies that the MS belongs to group 1, the MS in step 544 selects a PV value Pi for the current data rate, PD(r, 1) which denotes a PV value for decreasing a data rate when the data rate of an MS in group 1 is r.

On the other hand, if the power threshold P_r is less than or equal to the reception power P_th, which implies that the MS belongs to group 2, the MS selects in step 546 a PV value for the current data rate, PD(r, 2) which denotes a PV value for decreasing a data rate when the data rate of an MS in group 2 is r in step 546.

Then the MS generates a random number R for a PV test in step 548 and performs the PV test in step 550. If the PV test is passed, the MS decreases the data rate by one level and if it is failed, the MS maintains the data rate. In step 560, the MS transmits reverse traffic data at the changed or current data rate.

Location-based grouping of an MS according to its reception power and a grouping-based data rate control have been described above. In accordance with the present invention as described above, the full utilization of the reverse link is achieved fast and the reverse link is efficiently controlled without increasing overhead.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of increasing and decreasing a reverse data rate in a mobile station (MS) in a mobile communication system where a predetermined number of reverse data rates are available to each of a plurality of MSs within the service area of a base station (BS), the method comprising the steps of:
   receiving threshold power information indicating a power threshold for a pilot channel from the BS;
   measuring the reception power of the pilot channel received from the BS; and
   when the MS increases or decreases a current reverse data rate, increasing the current reverse data rate by two levels or decreasing the current reverse data rate by one level if the pilot reception power is greater than the power threshold, and increasing the current reverse data rate by one level or decreasing the current reverse data rate by two levels if the pilot reception power is equal to or less than the power threshold.

2. The method of claim 1, wherein the MS increases the current reverse data rate when all BSs in an active set of the MS request a reverse data rate increase.

3. The method of claim 1, wherein the MS decreases the current reverse data rate when at least one BS in an active set of the MS requests a reverse data rate decrease.

4. The method of claim 1, wherein the reception powers of pilot channels from all BSs in an active set of the MS are measured and the highest of the reception power is set as the pilot reception power in the reception power measuring step.

5. The method of claim 1, wherein the current reverse data rate is increased or decreased when a persistence vector (PV) test is passed.

6. A method of increasing a reverse data rate in a mobile station (MS) in a mobile communication system where a predetermined number of reverse data rates are available to each of a plurality of MSs within the service area of a base station (BS), the method comprising the steps of:
   receiving a pilot power threshold and access probabilities according to the pilot power threshold from the BS;
   measuring the reception power of a pilot channel;
   performing a first test using a first access probability if measured pilot power is greater than the pilot power threshold and performing a second test using a second access probability if the measured pilot power is equal to or less than the pilot power threshold, when the MS increases a current reverse data rate; and
   increasing the reverse data rate when the first or second test is passed.

7. A method of decreasing a reverse data rate in a mobile station (MS) in a mobile communication system where a predetermined number of reverse data rates are available to each of a plurality of MSs within the service area of a base station (BS), the method comprising the steps of:
receiving a pilot power threshold and access probabilities according to the pilot power threshold from the BS;
measuring the reception power of a pilot channel;
performing a first test using a first access probability if measured pilot power is equal to or less than the pilot power threshold and performing a second test using a second access probability if the measured pilot power is greater than the pilot power threshold, when the MS decreases a current reverse data rate; and
decreasing the reverse data rate when the first or second test is passed.

8. An apparatus for changing a reverse data rate in a mobile station (MS) in a mobile communication system where a predetermined number of reverse data rates are available to each of a plurality of MSs within the service area of a base station (BS), the apparatus comprising:
a control signal receiver for receiving a pilot power threshold and a reverse rate control command from the BS;
a reception power detector for measuring the reception power of a pilot channel; and
a controller for increasing a current reverse data rate by two levels if measured pilot power is greater than the pilot power threshold and increasing the current reverse data rate by one level if the measured pilot power is equal to or less than the pilot power threshold when the reverse rate control command indicates a rate increase, and decreasing the current data rate by two levels if the measured pilot power is equal to or less than the pilot power threshold and decreasing the current reverse data rate by one level if the measured pilot power is greater than the pilot power threshold when the reverse rate control command indicates a rate decrease.

9. The apparatus of claim 8, wherein the reception powers of pilot channels from all BSs in an active set of the MS are measured and the greatest reception power is set as the pilot reception power.

10. The apparatus of claim 8, further comprising a memory for storing access probabilities for changing the reverse data rate, and a random number generator for generating a random number to be used in a rate increase test or a rate decrease test, wherein the controller changes the reverse data rate if the random number satisfies an access probability read from the memory.

11. An apparatus for changing a reverse data rate in a mobile station (MS) in a mobile communication system where a predetermined number of reverse data rates are available to each of a plurality of MSs within the service area of a base station (BS), the apparatus comprising:
a control signal receiver for receiving a pilot power threshold and access probabilities according to the pilot power threshold from the BS;
a reception power detector for measuring the reception power of a pilot channel; and
a controller for performing a first test using a first access probability if measured pilot power is equal to or less than the pilot power threshold, performing a second test using a second access probability if the measured pilot power is greater than the pilot power threshold, when the MS decreases a current reverse data rate, and decreasing the reverse data rate when the first or second test is passed.

12. apparatus of claim 11, wherein when the MS increases a current reverse data rate, the controller performs a third test using the first access probability if measured pilot power is greater than the pilot power threshold, performs a fourth test using the second access probability if the measured pilot power is equal to or less than the pilot power threshold, and increases the reverse data rate when the third or fourth test is passed.

* * * * *